Figure 1:
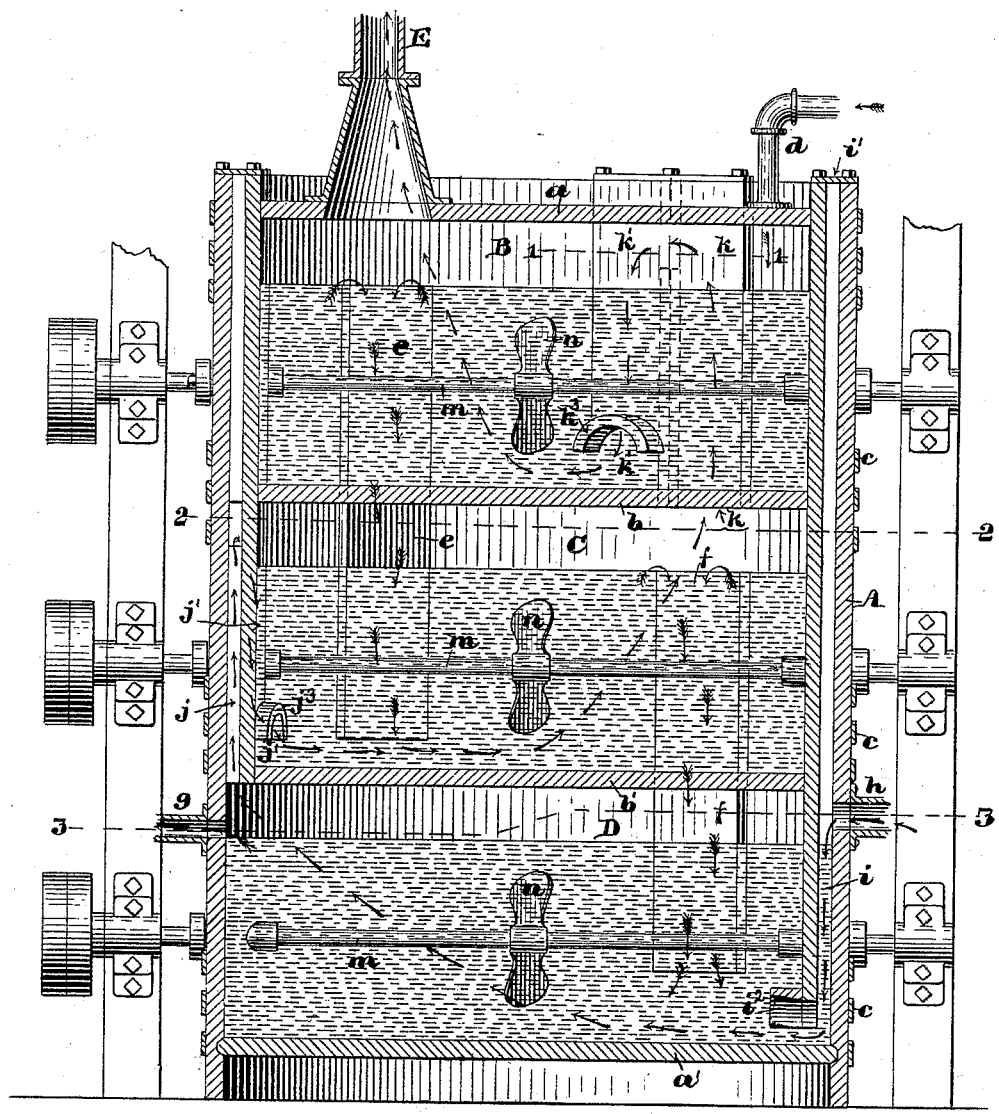

(No Model.) 2 Sheets—Sheet 1.

T. P. BURGESS.
APPARATUS FOR PRODUCING BISULPHITE SOLUTIONS.

No. 432,692. Patented July 22, 1890.

Witnesses:
Walter E. Lombard.
Henry H. Kendall.

Inventor:
Theodore P. Burgess,
by N. C. Lombard
Attorney.

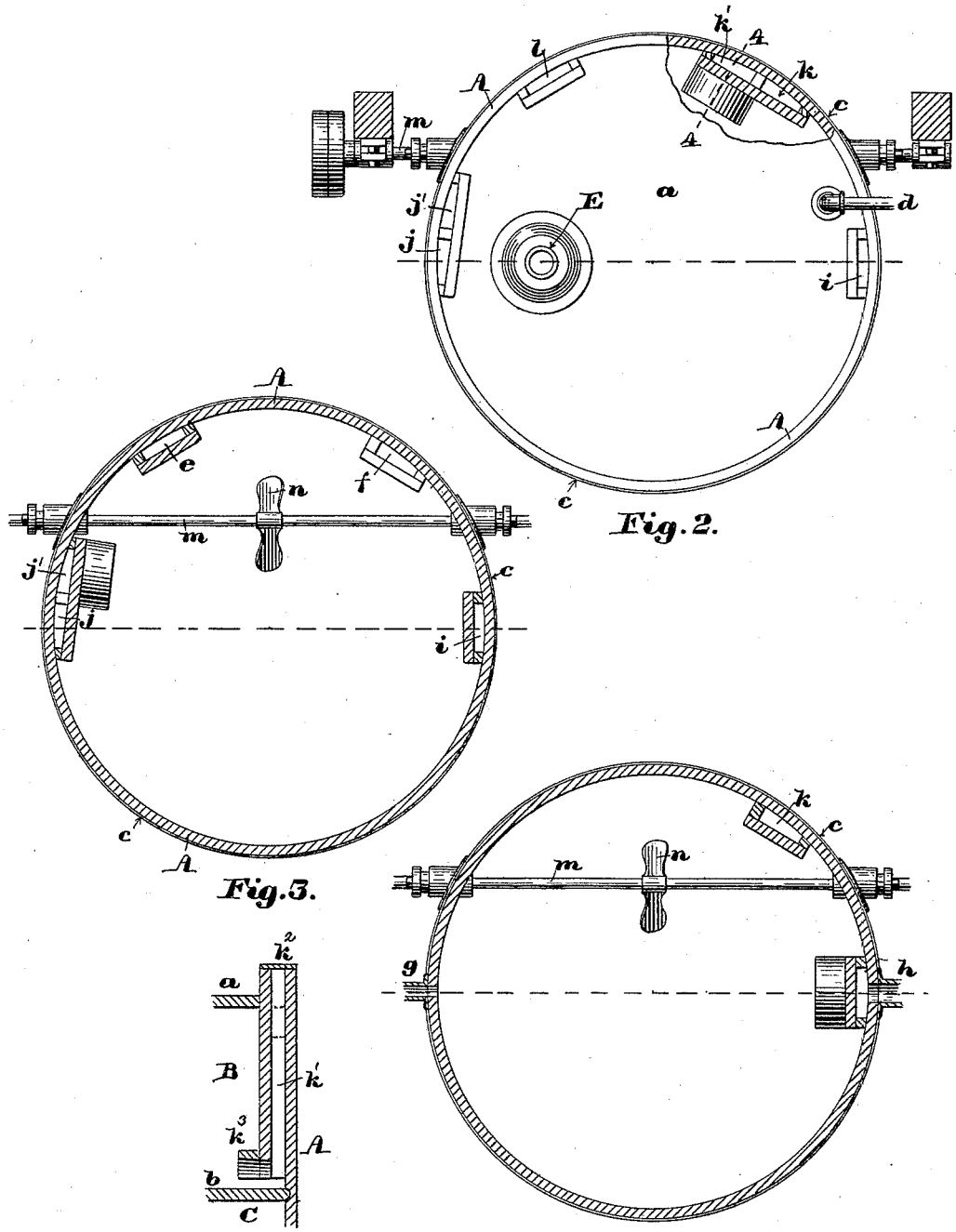

UNITED STATES PATENT OFFICE.

THEODORE P. BURGESS, OF DEDHAM, MASSACHUSETTS.

APPARATUS FOR PRODUCING BISULPHITE SOLUTIONS.

SPECIFICATION forming part of Letters Patent No. 432,692, dated July 22, 1890.

Application filed August 24, 1889. Serial No. 321,842. (No model.)

*To all whom it may concern:*

Be it known that I, THEODORE P. BURGESS, of Dedham, in the county of Norfolk and State of Massachusetts, have invented certain new and useful Improvements in Apparatus for Producing Bisulphite Solutions, of which the following, taken in connection with the accompanying drawings, is a specification.

My invention relates to apparatus for producing bisulphite solutions for the manufacture of wood pulp, and has for its object the production of an apparatus for the purpose mentioned that shall be simple in construction, compact in form and avoid the complicated and very extensive and expensive system of piping outside of the tanks now in general use; and it consists in certain novel features of construction, arrangement, and combination of parts which will be readily understood by reference to the description of the drawings, and to the claims hereinafter given, and in which the invention is clearly pointed out.

Figure 1 of the drawings is a central vertical section of my improved apparatus. Fig. 2 is a plan of same, with a small portion of the cover or head broken away, with the wall cut in section on line 1 1 on Fig. 1. Fig. 3 is a horizontal section on line 2 2 on Fig. 1. Fig. 4 is a similar section on line 3 3 on Fig. 1, and Fig. 5 is a partial vertical section on line 4 4 on Fig. 2.

In apparatus for this purpose now in general use several large distinct and separate tanks or vats are used, connected together by a more or less complicated system of piping having frequent bends, and connected by T's and quarter-turns, considerable portions of which are horizontal. These tanks are filled with milk of lime or milk of magnesia. The material held in solution is constantly being deposited in the pipes, which are not directly subject to the currents created by the agitators, and these deposits of lime or magnesia are constantly being made on the horizontal portions of the pipes and at the elbows and T's, and in consequence of this the pipes have very frequently to be opened and cleaned. This is very objectionable on account of the constant care and attention required and the consequent expense incurred in keeping the apparatus in running order; and it is especially bad because every time a pipe is opened, on account of the vacuum which has constantly to be maintained inside of the apparatus, air rushes in causing a chemical reaction to take place, which has an injurious effect on the acid, and which will cause it, when used, to injure the pulp. The vacuum has to be maintained during the cleaning in order to prevent the liquid in the tanks rushing out when the pipes are opened for that purpose. To obviate these objections I construct my apparatus as shown in the accompanying drawings, in which—

A is a cylindrical tank or vat closed at both ends by the heads $a$ and $a'$ and divided into three chambers by the partitions $b$ and $b'$, the whole being firmly secured together by suitable hoops $c$ $c$, as shown in Fig. 1. Within the tank or vat A are formed a series of vertical ducts or tubes contiguous to the inner surface of the cylindrical shell of the tank, which may be made of wood, clay, or other cheap material, or of lead.

In my apparatus the different pipes or ducts are everywhere perpendicular in position. Thus no resting-place in the pipes is afforded to the lime or magnesia to settle upon, and so clog the pipes. Moreover, the amount of pipes or ducts necessary for conveying the gas and liquid from one of these tanks to another is reduced to a minimum, and so it is comparatively inexpensive to construct. Further, the position of these pipes, being inside the tanks, permits of their being made of wood or clay, or other desirable material instead of lead, if preferred. Further, in my apparatus the point of access to the pipes for the purpose of cleaning, being above the level of the liquid in the reservoir instead of below, as in the apparatus now employed, allows the vacuum to be temporarily interrupted while the pipes are open for the purpose of being cleaned, thus preventing air from rushing into the tanks and injuring the liquor therein.

The arrangement and operation of the ducts for the circulation of the sulphurous-acid gas and the solution of lime or magnesia or lime and magnesia are as follows: The lime or magnesia solution enters the upper compartment B through the pipe $d$, and when the liquid has risen in said compartment to the desired height it overflows through the duct $e$ into the compartment C, and in like manner it overflows from said compartment through the pipe $f$ into the compartment D, and when said compartment is filled to the desired level the liquid passes off through the pipe $g$. The sulphurous-acid gas enters the lower compartment D through the pipe $h$, and the vertical duct $i$, which extends from the top to the bottom of the cylindrical shell A, has its upper end closed air-tight by the cap $i'$ and its lower end open to the chamber D, as shown in Fig. 1. The gas is delivered to said chamber at its bottom when filled to the desired height with the lime or magnesia solution and, rising through said solution to the upper part of said chamber, passes upward through the duct $j$, then downward through the duct $j'$, and enters the chamber C near its bottom, rises through the solution contained in said chamber, ascends through the duct $k$, and descends through the duct $k'$, and enters the chamber B near its bottom, rises through the solution therein to the upper part of said chamber, and the nitrogen and other waste gases not absorbed by the solutions in the several chambers through which they have ascended pass off through the pipe E. The ducts $j, j', k$, and $k'$ extend to the top of the cylinder A, and have their upper ends closed by air-tight covers $j^2$ and $k^2$, as shown in Fig. 1, so that by removing said covers said ducts may be readily and easily cleared from any obstruction. The duct $f$ is located directly beneath and in line with the duct $k$, so that it can be cleaned by a tool introduced through said duct $k$, and the upper head $a$ has cut through it a rectangular opening $l$ directly over the duct $e$, which opening is closed by an air-tight cover (not shown) in the same manner as the ducts $i, j, j', k$, and $k'$, and serves for the introduction of a tool for cleaning the duct $e$, when desired. The ducts $i, j'$, and $k'$, which have their lower ends open, have secured thereto just below said lower ends horizontally-projecting roof-like guides $i^3, j^3$, and $k^3$, respectively, each provided on its under side with a groove or channel which serves to guide the gas descending said ducts slightly inward toward the center of the chamber before it can rise to the upper part of the chamber. If it is thought desirable to introduce two separate currents of gas to these tanks at the same time, this can be effected by duplicating the gas-pipes herein described and placing them on the opposite sides of the tanks from those shown.

A horizontal shaft $m$ extends across each of the chambers B, C, and D, being mounted in suitable bearings outside of the cylinder A and passing through properly-packed openings in the wall of the cylinder A, and having mounted thereon within the chamber a screw-propeller-like agitator $n$, and provided at one end with suitable means of imparting thereto a rotary motion for the purpose of agitating the liquid contained in said chamber, and thus cause a more thorough commingling of the gas with the lime or magnesia solution.

The shafts $m$ may, if desired, be arranged across the center of each chamber; but I prefer to locate said shafts at one side of the center, as shown, for the reason that when so arranged the action of the blades of the agitator will cause a circular movement of the liquid about the chamber, thereby facilitating the absorption of the gas.

The advantages of my apparatus are, first, all the ducts or tubes connecting the several chambers are within the tank, are perpendicular and have no elbows or T-joints or horizontal sections, and, as a consequence, very little, if any, clogging of said ducts or tubes will occur; second, a complicated and expensive system of piping is avoided; third, the pipes or ducts all being within the tank may, if desired, be made of wood, clay, or other cheap material; fourth, the tanks or liquid-holding chambers being all contained in one large cylindrical vat, divided by two partitions, are less expensive to construct than several distinct and separate tanks; fifth, the whole apparatus occupies considerably less height and but about one-third the floor space required for similar apparatus of equal capacity now in use.

My apparatus, when once in operation, will work automatically as long as the necessary supply of materials is kept up and will produce continuously bisulphide of lime or magnesia. It will require no skilled labor to keep it in operation and very little care or attention of any kind.

What I claim as new, and desire to secure by Letters Patent of the United States, is—

1. In apparatus for the continuous production of bisulphites by the combination of sulphurous-acid gas with lime or magnesia or other suitable base in solution, a single tank or vat closed at both ends and divided by horizontal partitions into a plurality of chambers, one above the other, vertical overflow ducts or tubes without bends or horizontal portions connecting said chambers and extending from near the top of one chamber to near the bottom of the chamber next below, a pipe for admitting the lime or magnesia solution to the upper chamber, a pipe for the discharge of the bisulphite from the upper part of the lower chamber, ascending and descending ducts or tubes extending from the top of one chamber upward to the top of the chamber next above and then downward to near the bottom of said upper chamber, and having all of those portions which are filled with the liquid solution arranged vertically, a pipe communicating with a vertical duct opening into the lower chamber near its bottom, and a pipe for the escape of the unabsorbed gas from the upper chamber.

2. In an apparatus for the continuous production of bisulphites, the combination of the cylindrical tank or vat A, divided horizontally into chambers B, C, and D, the vertical ducts e, f, i, j, j', k, and k', built within the cylindrical vat A, the liquid-admission pipe d, the liquid-discharge pipe g, the gas-admission pipe h, and horizontal gas-guiding projections from the lower ends of the ducts i, j', and k', substantially as described.

3. In apparatus for the continuous production of bisulphites provided with vertical descending ducts for the passage of the gas to the bottom of the liquid-holding chamber, the combination, with each of said ducts, of a horizontal gas-guiding projection secured to the lower end of each of said ducts and having a groove in its under side for guiding the gas toward the center of the chamber.

4. In apparatus for producing bisulphites, the combination of a tank or vat closed at both ends and divided into a plurality of chambers by horizontal partitions, vertical overflow ducts or tubes open at both ends and extending from near the top of one chamber to near the bottom of the chamber next below for the passage of the liquid solution from the upper chamber to those below it, other ducts or tubes for the upward flow of the gas which open from the upper part of one chamber, extend upward to the upper part of the chamber next above, and then downward to near the bottom of said chamber, openings through the upper head of said tank directly over said ducts, and removable covers to said openings, said overflow and gas-conducting ducts being so arranged relative to each other and to the openings in the head of the tank that by removing said covers and introducing a suitable tool through said openings all of said ducts may be cleaned.

5. In apparatus for producing bisulphites, the combination, with a tank or vat closed at both ends and divided into a plurality of chambers by horizontal partitions, of overflow ducts or tubes open at both ends and extending from near the top of one chamber to near the bottom of the chamber next below, and other ducts or tubes for the passage of the gas extending from the top of one chamber upward to the top of the chamber next above, and then downward to near the bottom of said upper chamber, said ducts or tubes having all of those portions which are filled with the liquid solution arranged vertically, whereby they are rendered less liable to become clogged.

In testimony whereof I have signed my name to this specification, in the presence of two subscribing witnesses, on this 19th day of August, A. D. 1889.

THEODORE P. BURGESS.

Witnesses:
N. C. LOMBARD,
HERBERT E. LOMBARD.